June 22, 1948.　　　A. O. JOHNSON　　　2,443,860
LOCOMOTIVE THROTTLE VALVE
Filed March 14, 1947　　　　　　　　　　　3 Sheets—Sheet 1
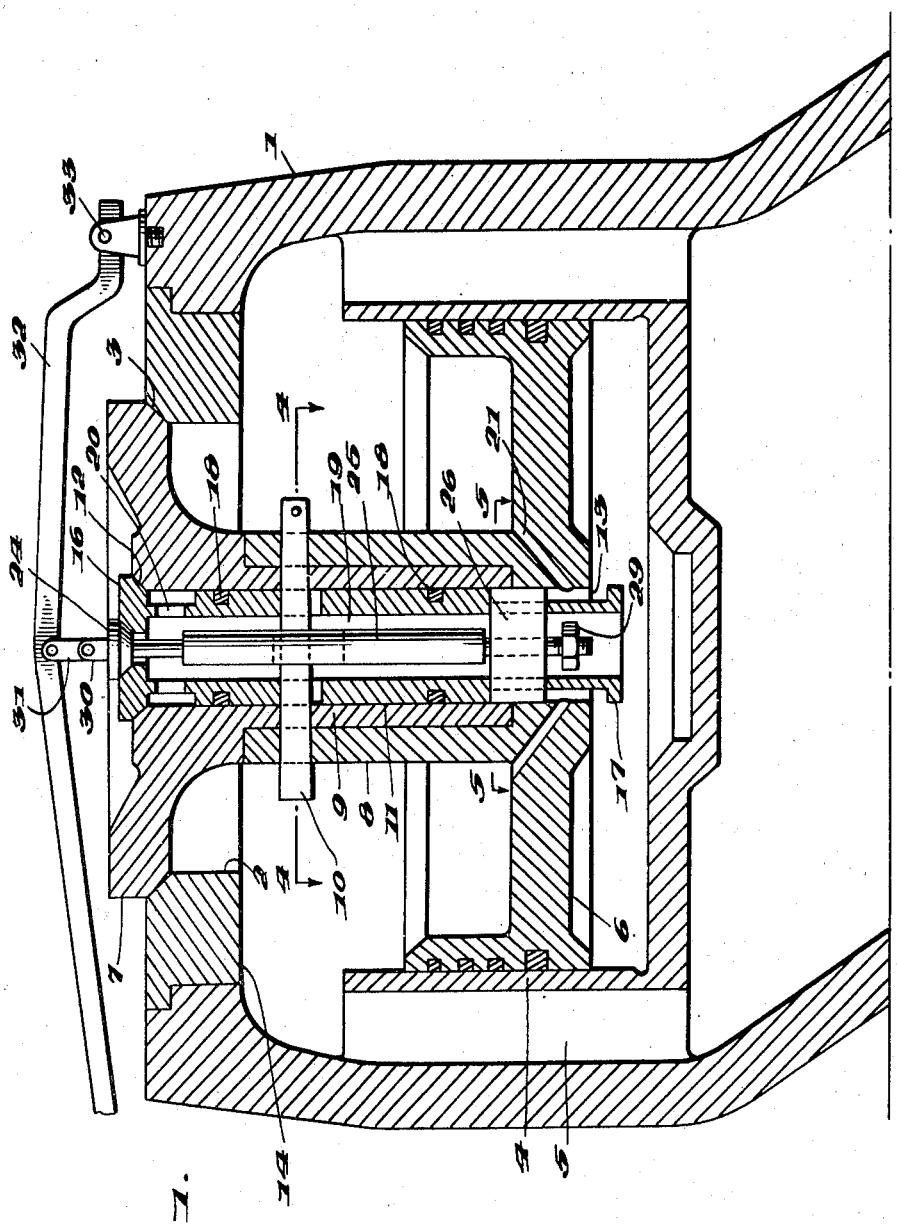
Inventor
Arthur O. Johnson
By Babcock & Babcock
Attorneys June 22, 1948. A. O. JOHNSON 2,443,860
LOCOMOTIVE THROTTLE VALVE
Filed March 14, 1947 3 Sheets-Sheet 2
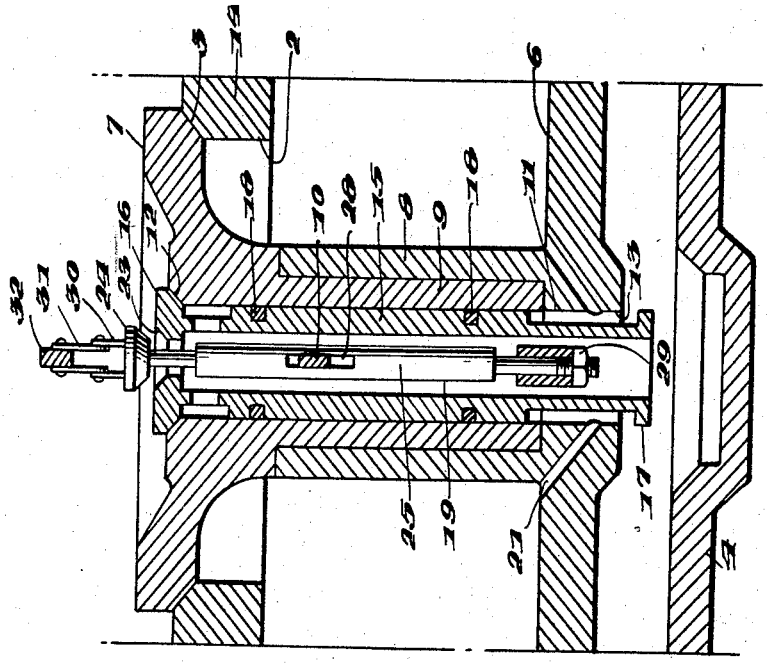
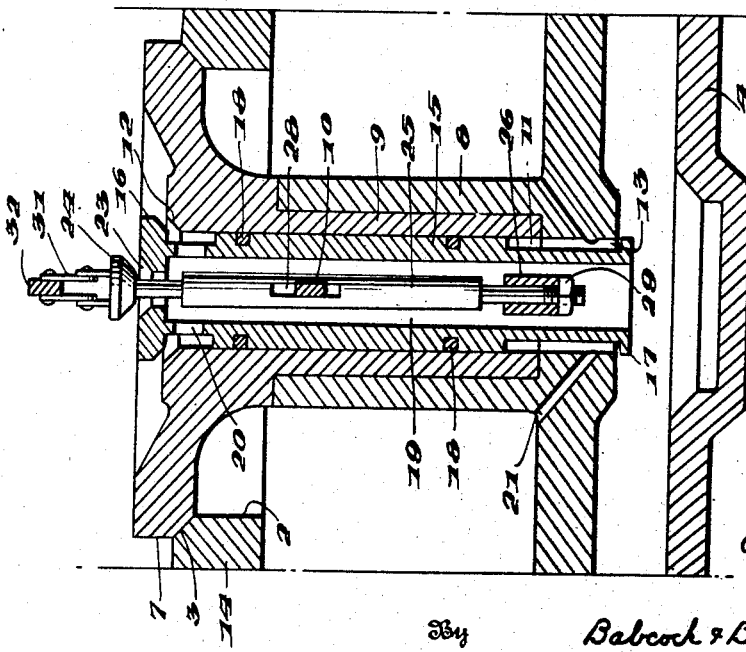
Inventor
Arthur O. Johnson
By Babcock & Babcock
Attorneys June 22, 1948.  A. O. JOHNSON  2,443,860
LOCOMOTIVE THROTTLE VALVE
Filed March 14, 1947  3 Sheets-Sheet 3
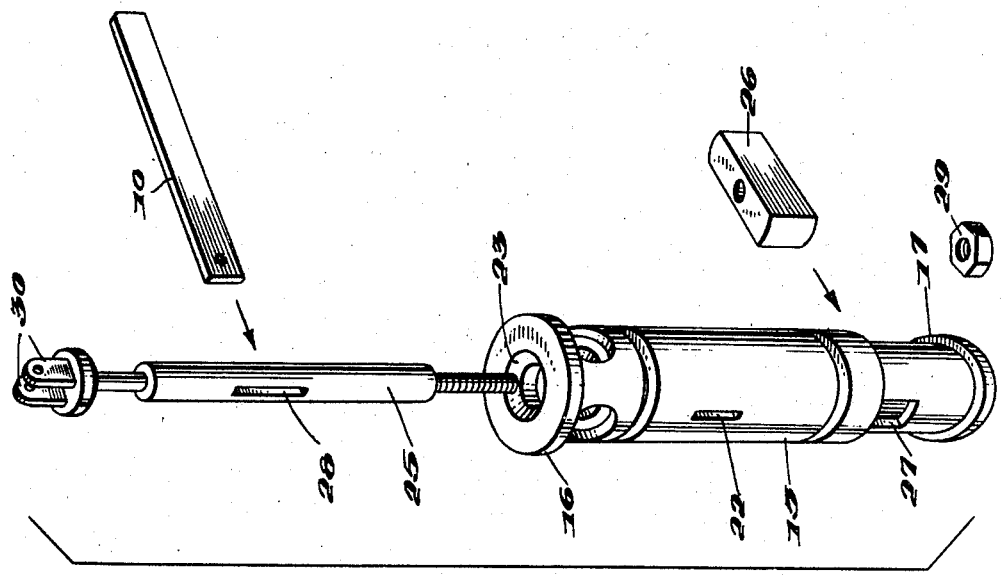
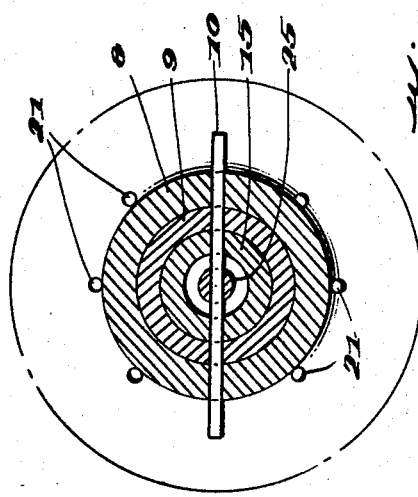
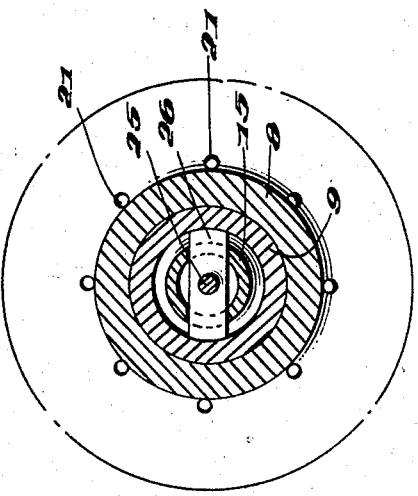
Inventor
Arthur O. Johnson
By Babcock & Babcock
Attorneys Patented June 22, 1948

2,443,860

UNITED STATES PATENT OFFICE 2,443,860

LOCOMOTIVE THROTTLE VALVE

Arthur O. Johnson, Altoona, Pa.

Application March 14, 1947, Serial No. 734,724

9 Claims. (Cl. 277—43)

This invention relates to locomotive throttle valves of the balanced type in which an actuating or balancing valve controls the balancing of the main throttle valve; and more particularly to improved control or actuating means for controlling the balancing of the main valve.

It is an important object of the invention to provide such a balanced throttle valve in which the actuating or balancing valve is itself balanced, thereby greatly facilitating the operation and smooth control of the throttle valve.

A further important object is to provide such a throttle valve in which a constant smooth flow of steam is admitted to the steam chest and engine cylinders of the locomotive commencing with the start of the valve opening operation and continuing until unseating of the main throttle valve, thus eliminating sudden surges of power with consequent spinning of the locomotive wheels such as commonly occurs when getting under way from a dead stop in locomotives equipped with conventional throttle valves.

A further important object is to provide such a valve in which the movable parts may be completely inserted and withdrawn as a unit, and operated through the valve port opening of the valve casing, thus permitting a substantially "bottle tight" valve casing construction and eliminating leakage and condensation of steam within the casing.

Other important objects are to provide such a throttle valve wherein the main valve may be automatically unseated by steam pressure; to provide such a throttle valve in which the manual force required to operate same is reduced to a minimum; and, to provide novel advantageous details of construction and assembly of the various movable valve parts.

In this application I show and describe only the preferred embodiment of my invention, simply by way of illustration of the practice thereof, as by law required. However, I recognize that my invention is capable of other and different embodiments, and that the details thereof may be modified in various ways without departing from my said invention. Accordingly the drawings and description herein are to be considered as merely illustrative, and not as exclusive.

In the accompanying drawings:

Figure 1 represents an axial cross-sectional view of a throttle valve embodying the preferred form of my invention, the valve being shown in completely closed position;

Figure 2, a fragmentary axial section transverse to that illustrated in Figure 1, showing the relative positions of the valve elements or parts in the first step or stage of the valve opening operation;

Figure 3, a fragmentary axial section similar to Figure 2, but showing the relative positions of the various parts or elements in the second step or stage of the opening operation;

Figure 4, a section on the line 4—4 of Figure 1, looking in the direction of the arrows;

Figure 5, a section on the line 5—5 of Figure 1, looking in the direction of the arrows; and, Figure 6, a disassembled or "exploded" view of the actuating or balancing valve and its various component parts.

Referring now in detail to the accompanying drawings, the numeral 1 therein designates in its entirety a throttle valve casing of usual construction adapted for mounting on the dry pipe of a locomotive boiler to control the flow of steam from the boiler, to the dry pipe, steam chest and steam cylinders.

This casing 1 is provided with an upwardly directed main steam supply port 2 provided with an upwardly directed bevelled valve seat 3 which will normally be disposed in the steam dome of the boiler, and the interior of said casing defines a main steam supply passage or conduit establishing communication between the port 2 and the dry pipe of the locomotive.

Disposed within the casing 1 in axial alignment with the port 2 and opening axially theretowards is a balancing or actuating cylinder 4, of conventional construction, which is preferably of substantially larger internal diameter than the port 2. The cylinder 4 may be supported in concentrically spaced relation within the casing 1 by suitable means such as the usual integral webs 5 to permit free passage of steam through the casing 1 past said cylinder.

Controlling the main port 2 is a main valve unit comprising an actuating or balancing piston 6 disposed for reciprocation in the cylinder and movable axially toward the port 2 under the influence of steam pressure within said cylinder 4; and a usual main throttle valve 7 carried by the actuating piston 6 for movement therewith in operative relation to the port 2, to control the admission of steam therethrough.

The piston 6 and the main valve 7 may be formed separately in accordance with usual conventional practices, and connected by means of relatively telescoping hollow sleeve portions 8 and 9 respectively, keyed together in assembled relation by an axially transverse key 10 passed through registering slots in said portions.

The main valve unit thus formed is provided with an axial bore 11 extending completely therethrough, with one end 12 of said bore opening through the main valve 5 to the exterior of the valve casing 1, to function as an intake port for the actuating cylinder 4 in the manner hereinafter described, and the other end 13 opening through said actuating piston 6 into the interior of the actuating cylinder to function as an exhaust port therefor in the manner hereinafter described. In the preferred embodiment illustrated, the intake port 12 is beveled to provide a valve seat for cooperation with the actuating or control valve of the invention.

In order to permit axial insertion and removal of the main valve unit to and from the casing 1, the port 2, which in the preferred embodiment is of smaller diameter than the piston 6, is preferably formed in an annular removable valve seat insert 14, the external diameter of which is at least equivalent to that of the piston 6.

The structural features thus far described have heretofore been known and used in the prior art, and hence are not claimed as my invention, but have been thus briefly described in order to facilitate an intelligent understanding of my invention, which resides in the provision in such a throttle valve of control or actuating means for efficiently controlling the main valve 7.

Said means comprises a balancing or actuating valve which is slidable axially through the bore 11 of the main valve unit and operable to open said intake port 12 while at the same time restricting or obstructing said exhaust port 13 to produce sufficient steam pressure within the actuating cylinder 4 to open the main valve 7.

This actuating valve comprises a stem 15 slidable axially through the bore 11 and intake and exhaust valve members or plugs 16 and 17 respectively carried at the opposite ends of said stem for simultaneous opposite coaction with the respective intake and exhaust ports 12 and 13 respectively, during axial movement of the valve stem 15 in either direction. Thus, it will be seen that as the actuating valve is raised, the intake plug or member 16 will be unseated from the intake port 12, while at the same time, the exhaust plug or member 17 will move axially towards the exhaust port 13 to progressively obstruct same and restrict the exhaust of steam therethrough. The exhaust plug 17 is of slightly smaller diameter than the bore 11 to permit insertion and withdrawal therethrough.

Direct communication between the intake and exhaust ports 12 and 13 respectively through the bore 11 is prevented in any suitable manner, this being accomplished in the preferred embodiment of the invention by forming the medial portion of the valve stem 15 of such diameter as to make a snug sliding fit within the bore 11, and further providing usual piston rings 18 seated in annular grooves in the stem 15 and in sliding fluid tight engagement with the cylindrical walls of the bore 11.

In order to permit entry of steam through the intake port 12 to the actuating of balancing cylinder 6, the actuating valve is provided with a steam inlet passage extending therethrough and establishing communication between the intake port 12 and the cylinder 4. In the illustrated embodiment, this inlet passage consists of the concentric axial bore 19 opening into the interior of the cylinder 4 through the exhaust valve member 17, and thus extending concentrically through the exhaust port 13, and a plurality of radial apertures 20 extending through the wall of the hollow valve stem 15 to establish communication with the bore 11 directly beneath the exhaust port 12.

In order to carry off the steam exhausted from the cylinder 4, the piston portion 6 of the main valve unit is formed with one or more suitably arranged exhaust passages 21 leading from the exhaust port 13 to the steam supply passage of the valve casing 1 above the piston 6.

In the preferred construction of the actuating valve illustrated in detail in Figure 6, the stem 15 is provided between the piston rings 18—18 with transversely opposed slots 22—22 through which the key 10 may be inserted in assembling the valve, and it is desirable to so locate the lower end edges of these slots 22—22 axially of the valve stem 15 that they will abut against the key 10 to prevent further upward movement of the exhaust valve member 17, after same has moved towards the exhaust port sufficiently to obstruct same the desired amount.

Preferably the relative positions of the slots 22 and the exhaust valve member 17 are such that the lower ends of the slots 22 engage the key 10 and arrest the upward movement of the valve stem 15 after the exhaust valve member 17 is so positioned as to substantially restrict or obstruct, but not entirely block the exhaust port 13, the restricting action being sufficient to produce an actuating pressure within the cylinder which will open the main valve 7, while at the same time permitting a continuous though relatively small flow of steam through the throttle valve to the engine cylinder prior to and during the opening of the main valve 7. While such arrangement is not essential considering the invention from its broader aspects, same is desirable and highly advantageous inasmuch as it prevents sudden surges of power to the engine cylinders, with consequent spinning of the locomotive drive wheels such as occurs with the use of conventional throttle valves wherein the exhaust of steam from the actuating or balancing cylinder is completely cut off just prior to opening of the main valve.

The actuating valve is further provided with an equalizing port 23 opening coaxially through the intake valve member 16 to the inet passage 19 to communicate with the interior of the cylinder 4, and a pilot or equalizing valve 24 movable axially relative to said actuating valve for controlling said port 23.

Said equalizing valve 24 is carried by a pendant stem 25 disposed through the port 23 into the inlet passage 19 to have its lower end slidably disposed through and guided by a valve guide 26 extending transversely across the inlet passage 19 with its opposite ends passed transversely through and supported in positioning slots 27 in the valve stem 15. In order to prevent interference with the key 10, the pendant stem 25 is provided with an axial slot 28 to receive said key and of sufficient axial extent to permit operative axial movement of said pendant stem 25. The diametrically opposed ends of the valve guide 26 are preferably in sliding abutment with the sides of the bore 11 to properly center said guide in operative position.

It will be apparent that the equalizing valve 24, the intake valve member 16 of the actuating valve, and the main valve 7, all open upwardly in the same axial direction.

In order to adapt these for control by mechanical means connected solely to the equalizing valve 24, from the exterior of the valve casing 1, suitable means are provided for establishing a positive connection between the actuating valve and said equalizing valve after a predetermined amount of opening movement of the latter to then cause opening movement of the actuating valve during continued movement of said equalizing valve.

In the preferred embodiment of the invention, such means is in the form of an abutment member such as a nut 29 threaded on the pendant stem 25 of the equalizing valve below the guide 26. This abutment member is spaced below the guide 26 in the closed or seated position of the equalizing valve 24, and is disposed for abutting engagement with the valve guide 26 after the equalizing valve 24 has been opened by raising same axially a predetermined distance relative to the actuating valve. Thereafter, it will be apparent that continued raising of the equalizing valve 24 will cause opening movement of the actuating valve to the extent permitted by the slot 22, as aforementioned.

Any suitable means connected to the equalizing valve 24 may be employed for controlling the throttle valve of the invention. To this end, in the preferred embodiment of the invention the equalizing valve 24 is provided with upwardly projecting yoke members 30 to which are pivotally connected corresponding ends of links 31, the other ends of which are pivotally connected to the medial portion of a lever 32 which extends diametrically across the top of the valve casing 1 and has one end fulcrumed thereon as at 33 for vertical swinging movement of said lever.

The opposite or movable end of said lever 32 may be connected by usual mechanical linkages to the locomotive throttle valve control rod for control thereby. Such a throttle valve control rod may be either of the conventional reciprocating type such as disclosed for instance in the Walters Patent 1,274,112, or of the rotary type disclosed in my copending application Serial No. 563,442, filed November 14, 1944.

In the operation of the invention, which is believed to be apparent from the foregoing description, to open the throttle valve from a completely closed or seated position such as is illustrated in Figure 1, the throttle valve control of the locomotive is actuated to swing the lever 32 upwardly in a vertical plane. This first unseats and raises the equalizing valve 24, as illustrated in Figure 2, thus permitting steam from the steam dome of the boiler to flow through the actuating valve to the cylinder 4 therebeneath. This balances the actuating valve to permit the subsequent raising of same without opposition from the steam pressure thereabove.

While the actuating valve is still closed, it will be noted that the exhaust valve member 17 is spaced below the exhaust port 13 in open position, thus permitting the steam from the equalizing port 23 to flow through the cylinder 4, the exhaust port 13 and passages 21 to the steam supply passage defined by the valve casing 1, and thence eventually to the locomotive engine cylinders to supply a small amount of motive power thereto.

During continued raising of the equalizing valve, the abutment nut 29 thereof engages the valve guide 26 to raise and open the actuating valve. It will be seen that during raising of the actuating valve the intake valve member 16 thereof will be unseated to permit an increased flow of steam through the intake port 12 to the actuating cylinder 4, while at the same time the exhaust valve member 17 will move toward the exhaust port 13 to increasingly restrict the flow of steam therethrough, until sufficient pressure is attained within the cylinder 4 to actuate and raise the piston 6. Complete closing of the exhaust port 13 will be prevented in the preferred embodiment of the invention by the limiting action of the key 10 in slots 22, as aforementioned and as shown in Figure 3.

Due to the difference in the relative rates of flow of steam to and from the cylinder 4, the difference in the diameters of the piston 6 and main valve 7 respectively, and the fact that the flow of steam through the exhaust passages 21 will be momentarily so restricted as to produce only a relatively small downward pressure on the piston, a point will be reached prior to seating of the exhaust valve 17 in which the upward force exerted on said piston 6 will exceed the sum of the downward forces thereon and will thus slightly raise same to unseat the main valve 7.

This raising or unseating of the valve 7 will be slight, since instantaneously with said unseating, steam will flow through the main port 2 to neutralize the actuating pressure beneath the piston 6. Thus this unseating of the valve 6 will not result in any sudden substantial increase in the flow of steam to the engine such as would spin the drive wheels of the locomotive, but will smoothly supplement the existing flow of steam through the exhaust channels 21.

After valve 7 is once unseated as aforementioned, the upward movement of the lever 32 may be continued to transmit further opening movement to said main valve 7 through the equalizing and actuating valves.

During adjustment of the main valve 7 in either direction, after same has once been unseated, it will be apparent that the exhaust port 13 will remain open to permit communication between the upper and lower sides of the piston 6 to balance the pressures thereon.

To close the throttle valve of the invention it is necessary only to lower the lever 32 by appropriate actuation of the throttle valve control means, thus causing seating of the main valve and the actuating and equalizing valves. Each of these will then be retained in seated position by downward pressure of steam thereon.

It will be seen from the foregoing that I have provided an improved form of throttle valve in which both the main valve 7 and the actuating valve are balanced during the opening or unseating of the main valve, with resultant ease of control; also that I have provided such a throttle valve in which sudden surges of power, with consequent spinning of the locomotive drive wheels and resulting damage, are eliminated.

Further, it will be apparent that I have invented improvements which may be embodied in existing types of throttle valves, and applied to existing types of locomotives, by minor modifications thereof; and that I have invented such an improved throttle valve in which all of the movable valve parts may be inserted, withdrawn and operated through the valve port opening of the casing, thus enabling the use of a substantially "bottle tight" casing.

I claim:

1. A throttle valve comprising a valve casing formed with a main steam supply port and an interiorly disposed steam supply passage connected therewith, an internally disposed actuating cylinder of substantially larger diameter than said port opening axially theretowards, and a pressure actuated main valve unit comprising an actuating piston movable axially in said cylinder, and a main throttle valve movable with said piston to control said main port, said unit being formed with an axial bore extending therethrough with one end opening to the exterior of said valve casing to provide an intake port for said cylinder and the other end opening into said cylinder to provide an exhaust port therefor, in combination with an actuating valve comprising a stem slidable axially through said bore and in fluid tight engagement with said main valve unit between said intake and exhaust ports to seal same against communication through said bore, intake and exhaust valve members respectively carried at the opposite ends of said stem for simultaneous opposite coaction with said respective intake and exhaust ports, said main valve unit being formed with exhaust passages leading from said exhaust port to said steam supply passage, said actuating valve being formed with a steam inlet passage extending concentrically through said exhaust port and establishing communication between said intake port and said actuating cylinder and an equalizing port opening axially through said intake valve member into said inlet passage, an axially movable equalizing valve controlling said equalizing valve, means connecting said actuating valve to said equalizing valve for axial movement therewith after a predetermined amount of relative axial movement of the latter, and means limiting the axial movement of the actuating valve to prevent complete closing of said exhaust port while permitting a sufficient restriction thereof to produce an actuating pressure within said cylinder.

2. A throttle valve comprising a valve casing formed with a main steam supply port and interiorly disposed steam supply passages communicating therewith, an internally disposed actuating cylinder of substantially larger diameter than said port opening axially theretoward, and a pressure actuated main valve unit comprising an actuating piston movable axially in said cylinder and a main throttle valve carried by said piston for movement therewith to control said main port, said unit being formed with an axial bore extending therethrough with one end opening to the exterior of said valve casing to provide an intake port for said cylinder and the other end opening into said cylinder to provide an exhaust port therefor, in combination with an actuating valve (comprising a stem) slidable axially through said bore, sealing means associated with said actuating valve for preventing communication between said intake and exhaust ports through said bore, intake and exhaust valve members respectively carried by said stem for simultaneous opposite coaction with said respective intake and exhaust ports, said main valve unit being formed with exhaust passages leading from said exhaust port to said steam supply passages, said actuating valve being formed with a steam inlet passage extending concentrically through said exhaust port and establishing communication between said intake port and said actuating cylinder and an equalizing port opening axially through said intake valve member to said inlet passage, an axially movable equalizing valve controlling said equalizing port, mechanical means for axially moving said equalizing valve axially toward open position, and means connecting said actuating valve to said equalizing valve for movement therewith after a predetermined amount of relative axial movement of the latter.

3. A throttle valve comprising a valve casing formed with a main steam supply port and an interiorly disposed steam supply passage communicating therewith, an internally disposed actuating cylinder of substantially larger diameter than said port opening axially theretoward, and a pressure actuated main valve unit comprising an actuating piston movable axially in said cylinder and a main throttle valve connected to said piston for movement therewith to control said main port, said unit being formed with an axial bore extending therethrough with one end opening to the exterior of said valve casing to provide an intake port for said cylinder and the other end opening into said cylinder to provide an exhaust port therefor, in combination with an actuating valve slidable axially through said bore and operable to simultaneously open said intake port while restricting the opening through said exhaust port, said main valve unit being formed with exhaust passages connecting said exhaust port to said steam supply passage, said actuating valve being formed with a steam inlet passage extending concentrically through said exhaust port and establishing communication between said intake port and said actuating cylinder and an equalizing port opening axially through said valve from the exterior of said valve casing to said inlet passage, an axially movable equalizing valve controlling said equalizing port, mechanical means for axially moving said equalizing valve toward open position, and means connecting said actuating valve to said equalizing valve for movement therewith after a predetermined amount of axial movement of the latter.

4. A throttle valve comprising a valve casing formed with a main steam supply port and an interiorly disposed steam supply passage communicating therewith, an internally disposed actuating cylinder of substantially larger diameter than said port in axial alignment with said port, and a pressure actuated main valve unit comprising an actuating piston movable axially in said cylinder and a main throttle valve connected to said piston for movement therewith to control said main port, said unit being formed with an axial bore extending therethrough with one end opening to the exterior of said valve casing to provide an intake port for said cylinder and the other end opening into said cylinder to provide an exhaust port therefor, in combination with an actuating valve slidable axially through said bore and operable to simultaneously open said intake port and restrict the opening through said exhaust port, said main valve unit being formed with exhaust passages connecting said exhaust port to said steam supply passage, said actuating valve being formed with a steam inlet passage extending concentrically through said exhaust port to establish communication between said intake port and said actuating cylinder, and an equalizing port opening to the exterior of said valve casing and in communication with said actuating cylinder, an axially movable equalizing valve controlling said equalizing port, operating means for said equalizing valve, and mechanical means connecting said actuating valve to said equalizing valve for movement therewith after a predetermined amount of axial opening movement of the latter.

5. A throttle valve comprising a valve casing formed with a main supply port and interiorly disposed steam supply passages communicating therewith, an internally disposed actuating cylinder of substantially larger diameter than said port opening axially theretoward, and a pressure actuated main valve unit controlling said port, said unit comprising an actuating piston movable axially in said cylinder, and being formed with a coaxial opening extending therethrough from the exterior of said valve casing to the interior of said cylinder, in combination with an actuating valve slidable axially through said opening to control the steam pressure within said actuating cylinder, said actuating valve being formed with a coaxial exteriorly directed equalizing port in communication with said actuating cylinder, an axially fixed internal valve guide carried by said actuating valve, a valve stem axially slidably disposed through said valve guide, an equalizing valve carried by said stem to control said equalizing valve port, said equalizing valve, actuating valve and main valve unit all being movable in the same axial direction to open position, external control means associated with said equalizing valve for moving same in an opening direction, abutment means carried by said valve stem to engage said valve guide after a predetermined amount of relative opening movement of said equalizing valve and cause opening movement of the actuating valve therewith.

6. A throttle valve comprising a valve casing formed with a main steam supply port and an interior steam supply passage communicating therewith, an internally disposed actuating cylinder of substantially larger diameter than said port opening axially theretoward, and a pressure actuated main valve unit comprising an actuating piston movable axially in said cylinder, and a main throttle valve movable with said piston to control said main port, said unit being formed with an axial bore extending therethrough with one end opening to the exterior of said valve casing to provide an intake port for said cylinder and the other end opening into said cylinder to provide an exhaust port therefor, in combination with an actuating valve comprising a stem slidable axially through said bore and in fluid tight relation therein between said intake and exhaust ports, intake and exhaust valve members carried at the opposite ends of said stem for simultaneous opposite coaction with said respective intake and exhaust ports, said main valve unit being formed with exhaust passages leading from said exhaust port to said steam supply passages, said actuating valve being formed with a steam inlet passage extending concentrically through said exhaust valve member and establishing communication between said intake port and said actuating cylinder, and mechanical means for moving said actuating valve to admit steam through said inlet port while simultaneously restricting the flow of steam through said exhaust port.

7. A main valve unit adapted to control the main steam port of a throttle valve of the type having an actuating cylinder opening toward said port comprising, an actuating piston to be axially movable in said cylinder responsive to steam pressure therein, and a main throttle valve carried by said piston to control said main steam port, said unit being formed with an axial bore extending therethrough with one end opening to the exterior of said valve to provide an intake port for said cylinder and the other end opening into said cylinder to provide an exhaust port therefor, in combination with an actuating valve slidable axially in said bore and operable to simultaneously open said intake port and restrict the opening through said exhaust port, packing means associated with said actuting valve to prevent communiction between said ports through said bore, said main valve unit being formed with an exhaust passage extending from said exhaust port to the exterior of said cylinder, said actuating valve being formed with a steam inlet passage extending through said exhaust port and establishing communication between said intake port and said actuating cylinder, and an equalizing port opening axially to said inlet passage through the intake end of said valve, an axially movable equalizing valve controlling said equalizing port, and means operable to connect said actuating valve and said equalizing valve for simultaneous movement after a predetermined amount of opening movement of the latter.

8. A main valve unit for controlling the main steam port of a throttle valve of the balanced type comprising an actuating piston, a relatively axially aligned main valve carried thereby, said unit being formed with an axial passage extending therethrough and an exhaust passage extending in a generally radial direction through said unit and intersecting said bore adjacent the piston end thereof, in combination with an actuating valve slidable axially in said bore, and blocking direct communication between the opposite ends thereof, comprising portions disposed for alternate movement therewith toward the respective opposite ends of said bore, said actuating valve being formed with an inlet passage opening through the piston end of said bore and communicating with the main valve end thereof.

9. A main valve unit for controlling the main steam port of a throttle valve of the balanced type comprising an actuating piston, an axially aligned main valve carried thereby, said unit being formed with an axial bore extending therethrough, in combination with an actuating valve member slidable axially in said bore and having sealing means blocking said bore to prevent direct communication between the opposite ends thereof, comprising valve elements carried by said valve member for alternate seating movement toward the respective opposite ends of said bore, said valve member being arranged to completely close the main valve end of said bore, said unit being formed with an exhaust passage communicating with the piston end of said bore, and said actuating valve member being formed with an inlet passage opening concentrically through the piston end of said bore, and means for causing axial movement of said actuating valve member relative to said main valve.

ARTHUR O. JOHNSON.

REFERENCES CITED

The following references are of record in the file of this patent:

UNITED STATES PATENTS

| Number | Name | Date |
| --- | --- | --- |
| 2,406,727 | Wetherbee | Aug. 27, 1946 |